US005950867A

United States Patent [19]

Martindale et al.

[11] Patent Number: 5,950,867

[45] Date of Patent: Sep. 14, 1999

[54] HEATED CONDIMENT DISPENSING SYSTEM

[75] Inventors: Richard A. Martindale; Antonio J. Jepson; James M. Tuyls, all of Vacaville; Matthew Thomas Straddeck, Fairfield, all of Calif.

[73] Assignee: Automatic Bar Controls, Inc., Vacaville, Calif.

[21] Appl. No.: 08/884,842

[22] Filed: Jun. 30, 1997

Related U.S. Application Data

[63] Continuation-in-part of application No. 08/771,209, Dec. 20, 1996

[60] Provisional application No. 60/021,021, Jul. 1, 1996, abandoned.

[51] Int. Cl.[6] .......... G01F 11/00

[52] U.S. Cl. .......... 222/1; 222/54; 222/61; 222/144.5; 222/146.5; 222/399

[58] Field of Search .......... 222/1, 54, 61, 222/144.5, 146.5, 399

[56] References Cited

U.S. PATENT DOCUMENTS

| | | | |
|---|---|---|---|
| 4,501,952 | 2/1985 | Lehrke | 222/146.5 |
| 4,553,023 | 11/1985 | Jameson et l. | 222/146.5 |
| 4,667,084 | 5/1987 | Regge | 222/146.5 |
| 4,941,597 | 7/1990 | Lopez et al. | 222/146.5 |
| 5,040,700 | 8/1991 | Compton | 222/146.5 |
| 5,832,178 | 11/1998 | Schave | 222/146.5 |

*Primary Examiner*—Joseph A. Kaufman
*Attorney, Agent, or Firm*—Townsend and Townsend and Crew LLP

[57] ABSTRACT

The invention provides a system and method of dispensing heated condiment from a condiment source. The condiment is flowed through a heater hose, and the temperature of the condiment is controlled within a predetermined range by sensing the temperature of the condiment in the hose and controlling the operation of the heater hose to maintain the temperature of the condiment within the predetermined range which results in the dispensing of condiment at a desired temperature.

9 Claims, 5 Drawing Sheets

HEATED CONDIMENT DISPENSING SYSTEM

This application is related to application Ser. No. 08/630,828, filed Apr. 10, 1996, now abandoned, and application Ser. No. 08/444,691, filed May 19, 1995, now U.S. Pat. No. 5,624,056. This application is a continuation-in-part application of application Ser. No. 08/771,209, filed Dec. 20, 1996. This application is a continuation-in-part application of provisional patent application Ser. No. 60/021,021, filed Jul. 1, 1996, now abandoned. The content of all of these applications are incorporated herein by reference for all purposes.

BACKGROUND OF THE INVENTION

The invention relates to a system for dispensing warm/hot condiments, products, or the like. Heretofore, when it was desired to provide warm condiments the condiments were heated in hot-water baths or heated cabinets using forced-air or convention systems. These systems utilized equipment that is heavy, expensive and difficult to maintain. Further, the existing equipment had to be removed to be cleaned. Thus, there is need for a simplified and inexpensive system for dispensing hot condiment.

SUMMARY OF THE INVENTION

The present invention relates to an improved system for dispensing hot or warm condiments. It is specially adapted to dispense condiments that should be warm or hot, such as barbecue sauce, and condiments such as creamy cheese for use with nacho chips and maple syrup which should be warm and which flow much better when heated. The invention provides for dispensing condiment rapidly and efficiently utilizing a heated hose connected between the dispensing nozzle and the condiment supply. The system for dispensing hot condiment includes a source of condiment. A pump is provided for moving condiment out of the source of condiment to a dispensing nozzle through a heated hose. The hose includes a central tube connected between the pump and the nozzle. A heating coil is provided on the outside of the central tube, and an insulating layer is formed over the heating coil. A temperature sensor is connected to the heating hose at a predetermined location to determine the temperature of the condiment in the central tube. A controller connected to the sensor controls the temperature of condiment inside of the central tube.

It is important that the system can deliver a condiment at a desired temperature to the delivery nozzle at a maximum desired delivery rate while at the same time not “cooking” the condiment in the heated hose during periods that no condiment is being delivered. In accordance with the invention, a balance is provided between the temperature of the heated hose and the length of the heated hose through which the condiment must flow to provide condiment at a desired temperature for delivery without degrading the condiment during periods of no flow.

The present invention provides for pumping room temperature condiment, such as cheese, butter-flavored oil, syrup, and spaghetti sauce, from a large package (i.e., three-gallon bags) and to heat it to a desired temperature, as it is being pumped to the dispense point. This permits delivery of a high quality condiment.

The present system has several distinct advantages when used with a condiment (product) such as cheese sauce. Since the cheese sauce is not a pure dairy product, but rather consists of a low pH (high acid) content due to the tomato used in the production of the product, it is shelf stable at room temperature for months. The combination of an aseptic packaging method utilizing a high acid content product, with the present system capable of pumping the product and then heating it, on demand, is a special advantage of the system. For non-dairy type products, such as butter-flavored oil, syrup, spaghetti sauce, flaked ice flavorings, and ice cream toppings, the heating of product drawn from large three-gallon bags while moving the product to the dispense pint in the manner described is a special advantage of the present system of the invention.

OBJECTS OF THE INVENTION

It is a particular object of the present invention to provide an improved system for dispensing condiment or the like which system can provide hot or warm condiment and is inexpensive and easy to maintain and clean. Other objects and advantages of the present invention will be apparent from the following detailed description read in view of the accompanying drawings which are made a part of this specification.

DETAILED DESCRIPTION OF THE INVENTION

The present invention is directed to a system for dispensing heated condiments. A source of condiment is provided, and a pump for moving condiment out of the source of condiment is operably connected to the source of condiment. A heater hose having a central tube is connected between the pump and a dispensing nozzle. A heating element or wire is provided on the outside of the central tube. The heating element has an insulating layer over it. A temperature controller for controlling the operation of the heating element based on the temperature of the condiment is provided.

Figure 1:
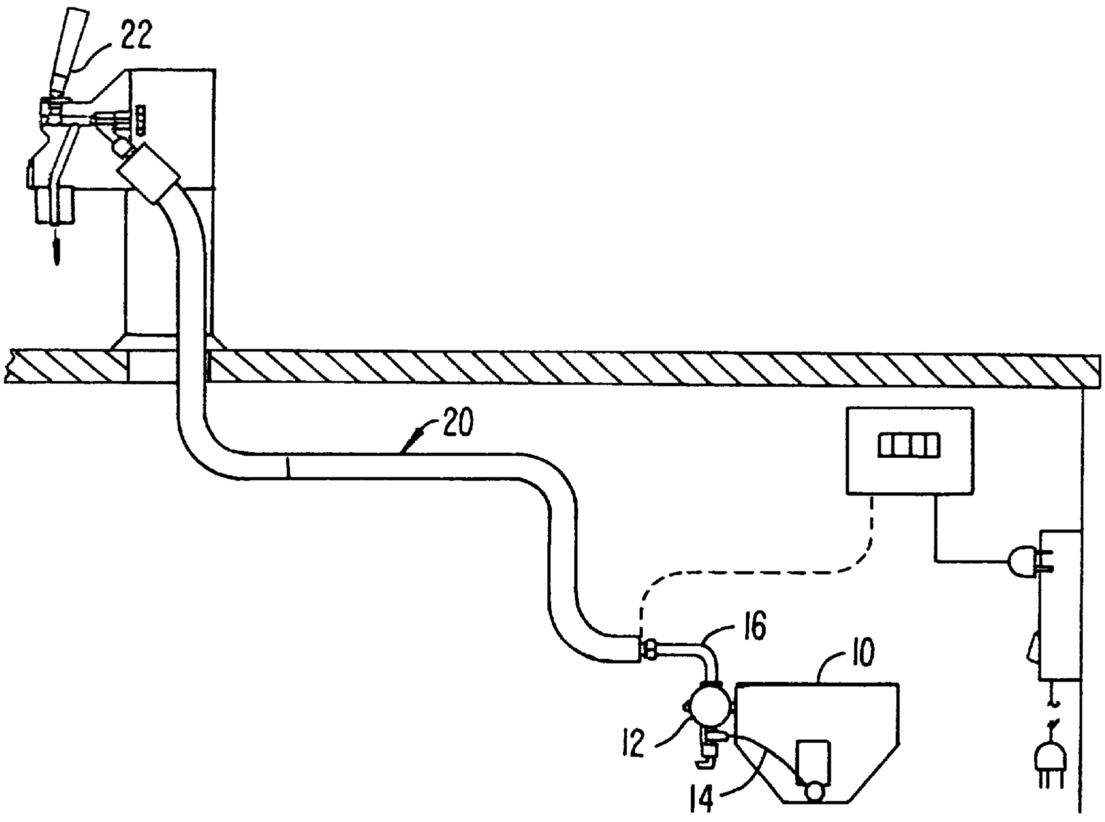
FIG. 1 is a schematic diagram illustrating a system for dispensing condiment in accordance with the invention through a tower dispenser having a lever actuator.
Figure 2:
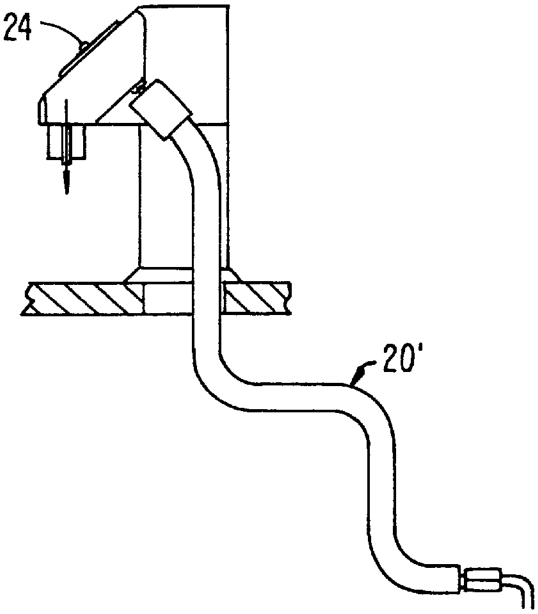
FIG. 2 is a partial schematic diagram illustrating a system for dispensing condiment through a tower dispenser having a push-button actuator.
Figure 3:
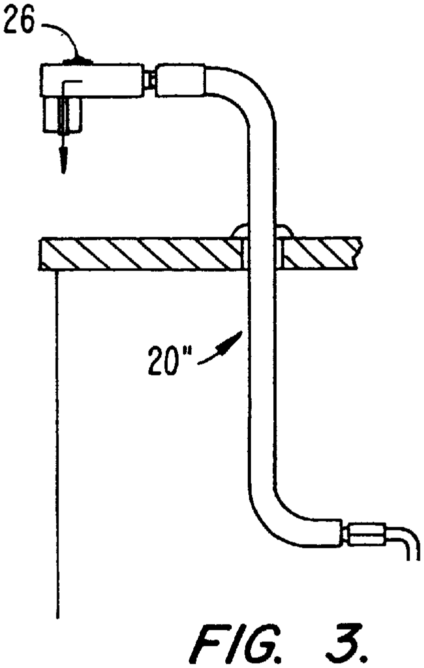
FIG. 3 is a partial schematic diagram illustrating a system for dispensing condiment through a flexible hose dispenser having a push-button actuator.

Referring to FIG. 1, a source of condiment 10 is shown and is operatively connected to a typical condiment pump 12. A tubular connection 14 between the pump 12 and the condiment source 10 provides a flow path for moving condiment through the pump and into tubing section 16. The tubing section 16 is connected to the central product tube 18 (see FIG. 4) located inside a heater hose 20. The central product tube 18 of the heater hose 20 is connected to a dispensing apparatus. FIG. 1 shows the use of a lever activated tower dispenser generally designated 22. FIGS. 2 and 3 respectively show a push-button tower dispenser 24 and a push-button actuated flexible hose 26. These dispensers and actuators are well known in the art. Downwardly directed arrows at each of the dispensers indicate delivery of hot/warm sauce when the actuators are operated.

Figure 4:
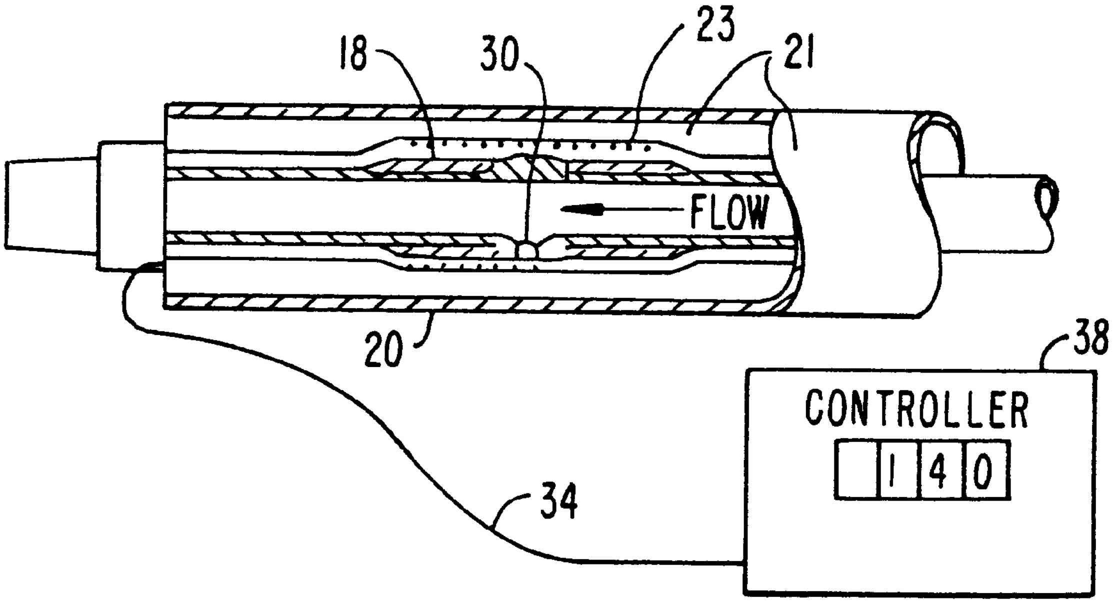
FIG. 4 is a schematic illustration partially in section showing one form of heated hose construction including a heat-sensing device and a temperature controller.

FIG. 4 shows a view of one form of heater hose with a portion cut away to show its interior. The heater hose includes an outer tubular portion 20 concentrically arranged around a central product tube 18 and forming an annulus therewith. The annulus is filled with insulating material as indicated by 21. A heater wire or element 23 is arranged about the central product tube 18 and is used to heat it. The preferred heater hose in accordance with the invention is available from Furon Co. located at 10585 Main Street, Mantua, Ohio 44255.

Figure 5:
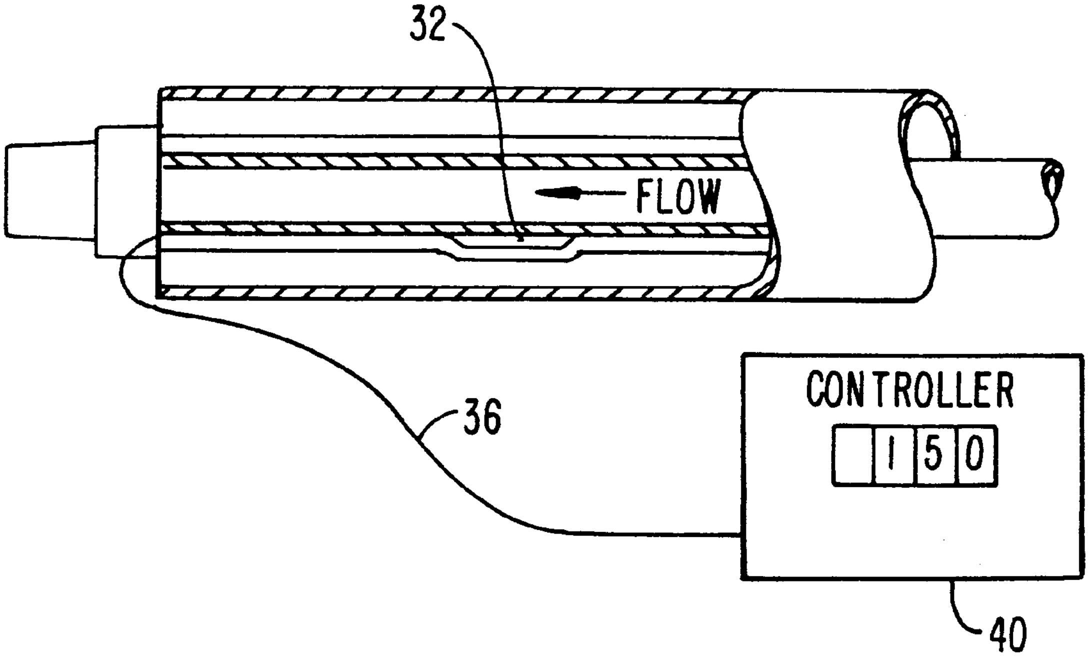
FIG. 5 is a schematic illustration partially in section showing a second form of heated hose construction including a heat sensor and a temperature controller.

The system also includes a means for measuring temperature and for controlling the duration of time or intensity that the heater wire is operating. The embodiment of FIG. 4 includes a thermocouple 30 that is mounted in product tube 18 flush with the inner wall of the product tube. In this arrangement, condiment in the tube is in direct contact with the thermocouple; therefore, rapid and accurate temperature measurements are available. The embodiment of FIG. 5 shows a thermocouple 32 mounted on the outside of the product tube. This arrangement is easier to fabricate but gives somewhat slower temperature readings. As indicated herein, the location of the thermocouple on the product tube is important to the success of the present invention. Thus, the thermocouple must be located at least a predetermined distance from the delivery nozzle to insure that condiment of a desired temperature is dispensed from the nozzle even at times of continuous maximum flow of condiment due to continuous use.

In both the embodiments of FIG. 4 and FIG. 5 the thermocouple is connected to a controller 38, 40 that may be set to turn the heating wire on and off. For example, controller 38 indicates a temperature of 140° F. which is the temperature which will turn off the heating system. The controller will be programmed to start the heating when the temperature in the product tube falls a preset amount, for example, 5° to 10° or 15° F.

It is important to note that the temperature of the condiment in the heater hose when no condiment is flowing must not exceed a temperature which "cooks" the condiment or otherwise degrades it. Thus, it is important that the temperature controller have an upper setting for a temperature that does not cause the condiment to exceed the "cook" temperature. The temperature controller is set to turn off the heating wire when this temperature is reached. The temperature controller has another setting, usually 5–15° F. below the upper setting which, when reached, will turn on the heating wire to again provide heat to the condiment.

It is also important that when the condiment is being constantly flowed to and out of the delivery nozzle that there be enough heater hose to raise the temperature of the condiment as it flows through the hose to the desired temperature for delivery. Thus, the system must be balanced—not so hot as to burn or degrade condiment when not flowing, but hot enough and with a long enough hose to elevate the temperature of the condiment under continuous (or nearly continuous) flow conditions.

In regard to providing a balanced system, the following parameters are important in the design of the system:

Given:

1—Desired dispense temperature

2—Desired dispense rate (oz. per sec.)

3—Condiment heat transfer rate

4—Condiment expansion per deg. F.

Std. Requirements:

1—Dispense at desired temp. at max. rate

2—Hold at desired temp. w/o burning, indefinitely

3—Hold safe working pressure to 150 psi @ 185° F.

Find:

1—Optimum hose ID (based on no flow heat transfer)

2—Minimum hose length (based on max. flow heat transfer)

3—Optimum thermal couple location (based on max. flow heat trans. per inch) for measuring temperature in hose.

The system may be designed taking into account the above parameters and by appropriate calculations. The following is an example of a system for providing heated condiment in accordance with the invention.

| A. System Requirements: | | |
|---|---|---|
| 1. Product Analysis | | |
| a. | What is it and what is its Specific Heat? | $C_P$ = 0.045 BTU/Lb/° F. (liquid cheese) |
| b. | Desired (or required) dispense temperature | $T_M$ = 140° F. |
| c. | Desired dispense rate (ounces per second) | $R_D$ = 1 Oz/Sec = 225 Lbs/Hr |
| d. | Minimum ambient BIB temperature | $T_A$ = 70° F. |
| e. | Minimum Safety Factor (heat loss, flow changes) | SF = 20% (1.2) |
| 2. Fixed Parameters for Condiment (liquid cheese) Delivery Systems: | | |
| a. | Pump pressure for product (from a product chart) | P = 70 PSI |

-continued

| A. System Requirements: | | |
|---|---|---|
| b. | Minimum Tubing ID for product (from a product chart) | ID = 3/8" |
| c. | Maximum allowable Watt Density (from a product chart) | WD = 1.5 Watts per sq. in. |
| d. | Maximum allowable surface temp. (from a product chart) | $T_S$ = 149° F. (controller cap.) |
| e. | Maximum Tubing Length (from a product chart) | L = 96" with ¾' insulation |
| f. | Conductivity Adjustment factor (from a K-factor chart) | $K_A$ = 1.20 BTU × in/hr × ft$^2$ × ° F. |
| g. | Heat Loss from hose insulation (from Heat Loss chart) | $H_L$ = 0.328 Watts per 8 ft. |
| 3. Power Required for Heater (Q): | | |
| a. | $$Q = \frac{R_D \times C_P \times (T_M - T_A) \times SF}{3412} + \frac{(T_M - T_A)H_L}{1000} =$$ 0.249 + 0.023 = 250 W Heater (approx.) | |
| 4. Final Dimensions of Heater Hose: | | |
| a. | Length of Hose | L = (Total Watts Required)/Watt Density) 250 Watts/(1.33 Watts/in$^2$ × 18.84 in$^2$/ft) L = 10 ft |
| b. | Incremental Temperature Rise per foot | $T_{INC} = (T_M\ T_A)/L$ = 70° F./10 ft = 7° F./ft |
| c. | Thermocouple Location | $L_{TC} = (T_S - TbM)/T_{INC}$ = 9° F./7° F./ft = 15 inches from the delivery nozzle |

Figure 6A:
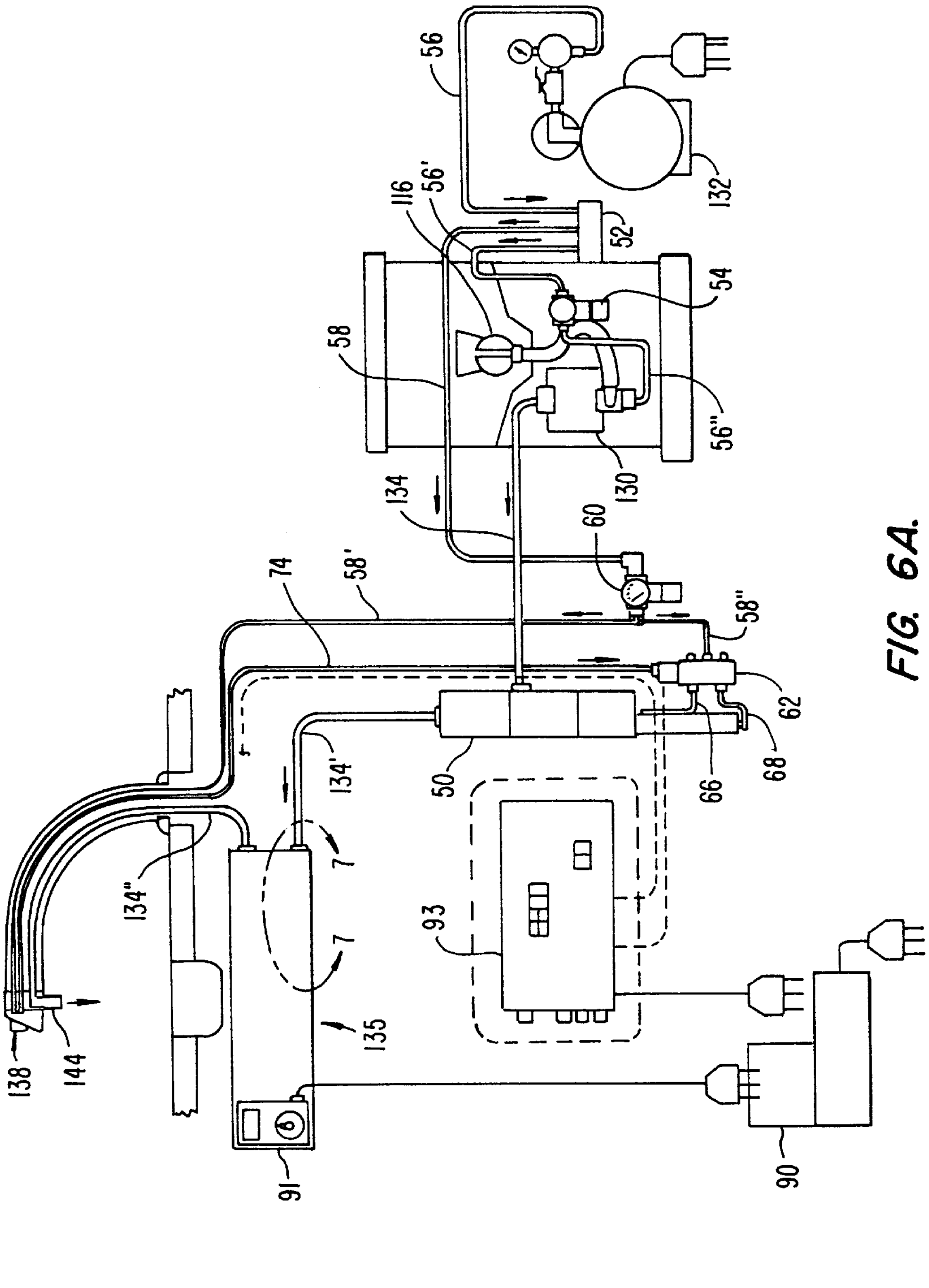
FIG. 6*a* is a schematic diagram illustrating in greater detail a system for dispensing condiment in accordance with the invention through a goose neck tower dispenser having a push button actuator.
Figure 7:
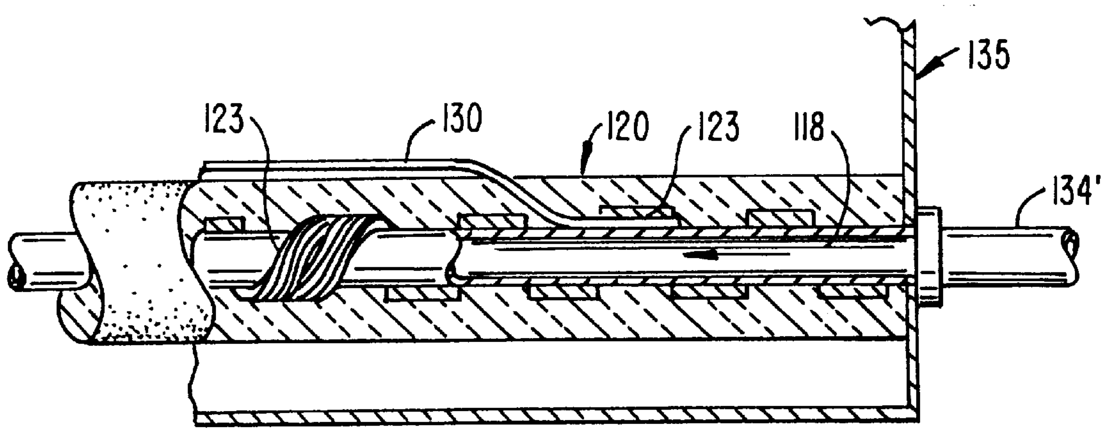
FIG. 7 is a schematic illustration partially in section showing a form of heated hose construction of the embodiment of FIG. 6*a* at the area indicated by 7—7.

Refer now to FIGS. 6*a* and 7 where the preferred embodiment of the present invention for dispensing heated condiment is shown. This embodiment includes a draw-back valve which is described and claimed in copending application Ser. No. 08/771,209, which is incorporated herein by reference.

A source of gas, such as, for example, air compressor 132, is provided and is connected through an air distribution device 52 and an air pressure regulator 54 to the inlet of condiment pump 130. A source of condiment, indicated as 116, is connected by an appropriate conduit to pump 130. When the system is activated by pushing the button of push-button valve 138, the pump will act to deliver condiment through conduit 134, draw-back valve 50, conduit 134', heating unit 135, and conduit 134" for delivery out of nozzle 144.

During periods when the apparatus is not dispensing condiment, i.e., the button of the push-button valve 138 is not depressed, positive air pressure is maintained to the upside of pump 130 from compressor 132 through conduit 56, air pressure regulator 54 and conduit 56'. Positive air pressure is also maintained to the push-button valve 138 through conduit 58, air control regulator 60 and conduit 58' to the upstream portion of push-button valve 138. Positive air pressure is also maintained in conduit 58" to air control valve 62. The air control valve is connected to the upper inlet 64 (FIG. 6*b*) of the piston housing section 65 of the draw-back valve 50 by means of conduit 66 and to the lower inlet 70 by means of conduit 68. When the system is not in operation, i.e., push-button valve 138 is closed, the air-control valve 62 provides positive air pressure in conduit 66 to inlet 64 to act on the piston in piston section 65 to hold the valve stem 72 in the closed position as illustrated by solid lines in FIG. 6*b*.

Air conduit 74 is connected from the downstream portion of push-button valve 138 to the air control valve 62. When the push-button valve 138 is opened, i.e., by depressing the button, air flow in conduit 74 raises the pressure therein and causes the air control valve to switch air flow to conduit 68 and inlet 70 of the piston housing section 65 of the draw-back valve 50 causing the valve stem 72 to move to the position shown by phantom lines in FIG. 6*b*. In this position, the reduced diameter portion 84 of the valve stem moves into the vacuum chamber 82 of the valve housing and opens conduits 134, 134' for flow of condiment to the heating unit 135 and then to dispensing nozzle 144 by means of pump 130 which, as noted, always has air operating pressure through conduit 56', air pressure regulator 54, and conduit 56".

Figure 6B:
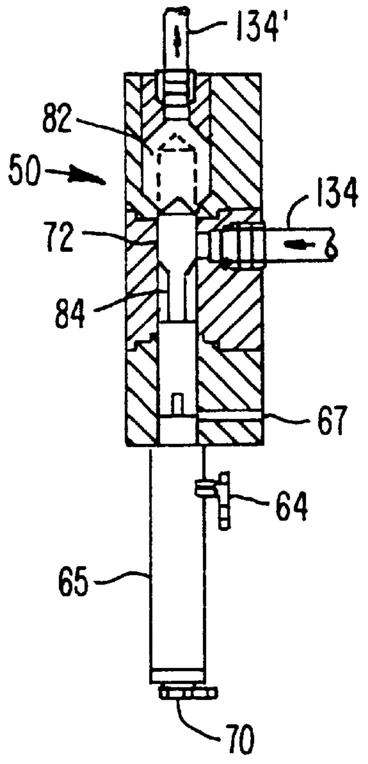
FIG. 6*b* is an expanded view partially in section of the draw-back valve of FIG. 6*a;*

When the push-button valve 138 is closed, i.e., pressure on the button is released, air to conduit 74 is cut off and air pressure is developed in conduit 58' causing air control valve to again direct air flow through conduit 66 into port 64 of piston section 65 to move valve stem 72 back to close the condiment dispensing valve as shown in solid lines in FIG. 6*b*. This movement of the valve stem draws a vacuum in the valve chamber and thus draws back condiment from conduit 134' and prevents drip at nozzle 144.

The heating unit, indicated generally by the number 135, will now be described in more detail with particular reference to FIGS. 6*a* and 7. The condiment or product meant to be heated is directed from source 116 through conduits 134, 134' to the heating unit 135. A heater hose 120 is provided inside of the heating unit 135. Preferably, the heater hose 120 is coiled within the heating unit. The heater hose 120 may make several 180° turns to provide the desired length for heating the condiment. Preferably, five turns in the hose 120 are provided within the heating unit 135.

The heater hose 120 includes a central product tube 118 which is a continuation of or is connectable to conduit 134' at the entry of the heating unit 135 and to conduit 134" at the exit of the heating unit 135. A heater element 123 is spirally wound around the product tube 118 in direct contact therewith. A thermocouple 130 is silver soldered to the product tube 118 to provide temperature information therefrom. A power source 90 supplies power to the heating element through a temperature control unit 91. The temperature control unit 91 includes an on/off switch and upper and lower temperature settings which are activated when the controller is switched to the on position. Preferably, the temperature settings are locked in when the unit is assembled at the factory with the desired upper and lower temperature settings. Thus, when the heating unit 135 is switched on and push-button valve 138 is pushed, warm condiment or product will be dispensed from nozzle 144. This will continue so long as the button 138 is depressed. An optional electrical portion control unit 93 shown inside the dashed lines of FIG. 6*a* may be included in the embodiment of apparatus and when activated will provide a preset portion of product each time the push-button valve 138 is depressed. The portion control units are commercially available.

In accordance with the invention, heating unit 135 may be assembled as is now set out. Cut two 8-foot lengths of J-type thermocouple wire. Strip and twist one end, ⅜ inch long, of each wire. Silver solder twisted bare end to middle of inlet section. Use silver solder flux. Make solder joint small but strong. Make sure solder fillet is smooth and free of sharp edges or protrusions. File smooth, if necessary (heating element will ride on top of solder joint). Rinse with water when finished to remove any excess flux. Repeat solder operation to solder second thermocouple wire to middle of forth section (entrance to second zone). Rinse excess flux. Dry excess water. Use glass tape to tape the lead end of one heating tape to the entrance of the tube coil flush with the coil ends. Spiral wrap the heating tape to cover one-half of the entire tube coil. Spacing between wraps will be about ⅛ inch. Loose wind to find even spacing then wrap tight by turning in direction of spiral with hand twists starting at beginning of heating tape. Repeat operation several times until spacing is even and tape is tight. Make sure one wind of heating tape is directly over solder joint for thermocouple. Repeat heating tape wrap operation on second zone. Start at beginning of second zone at middle coil turn. Make sure end of first heating tape and beginning of second heating tape are close together at middle of center tube coil. (Thermostat bulb is four inches long and will rest on end of first heating tape and beginning of second heating tape.) Check for shorts. Wrap glass insulation tape around 1-inch diameter white Teflon spool for easier tube wrapping. Wrap heating tape completely and tightly with glass insulation tape. Cover any bare spots with small pieces of glass tape. Check for shorts again. Layout large sheet of ½-inch thick white silicon rubber sheet. Cut seven pieces 5×12 inches. Cut several pieces (5) of glass tape about 5 inches long and hang from end of table. Wrap rubber sheet around tube and tuck in about 1½ inches on edge. Stretch as wrapping. Tape with sections of glass tape to secure. Cut half (6-inch) sections (5×6) of rubber sheet for spans of tube with thermocouple and wrap, tuck and tape as per above. Wrap tube bends with 3×5 sections or as cut to fit to cover tube bends. Stretch and wrap as per previous wraps on straight sections. Wrap and completely cover rubber sheet with glass tape. For following steps, rinse all excess flux from solder joints with water, then dry excess water. Silver solder 7-foot white 16 AWG wire leads to each heating element lead. Clamp one 8-foot and one 1-foot green 16 AWG wires to bare spot on tube entrance to clear bulkhead fitting. Extend bare ends of wire 1/16 inch from under clamp. Silver solder ends of ground wire to tube on bare end side of clamp. Put tags according to heating element wiring harness schematic on other ends of ground wire, heating element leads, and thermocouple leads. Cut a 5-foot section of plastic conduit. Drill holes in enclosure for ground terminal (bolt size) and thermostat bulb clearance (0.3"). Replace black rubber O-rings in bulkheads with red-brown silicon O-rings. Two per fitting. Make gaskets for bulkheads from black rubber syrup separator gaskets by cutting half of width span with exacto knife. Install on bulkheads. Install bulkheads loosely in enclosure holes. Fit tube into bulkheads then tighten flanges to check spacing inside enclosure. Add more insulation on ends of tube coils until there is a slight press fit between ends of tube bends and inside of enclosure. Tape small sections with glass tape. Cut three pieces of rubber sheet insulation (½-inch thick) to fit in enclosure with ¼-inch clearance around edges. One on bottom, two on top. Feed thermostat bulb through 0.3-inch hole in enclosure. Place thermostat bulb on middle coil bend so that end of bulb is resting on top of end of first heating tape and beginning of bulb is resting on top of the start of the second heating element. Wrap the bulb firmly against the tube coil with glass tape until it is secure (about six layers of wrap). Wrap and tape with a sized section of rubber sheet. Feed wiring harness through threaded connector flange, then hole in enclosure, then rubber O-ring, then right angle connector, then through plastic conduit. Make sure wire marker tags stay on. Install 9-pin connector on end of harness. Connect 1-foot green ground wire to enclosure with closed terminal bolted in hole cut for ground lead connection. Open thermostat cover and set to desired settings (for example, 125°14 135° F. and 145°–155° F.). Move set screw to top position and tighten. Screw cover back on.

Figure 8:
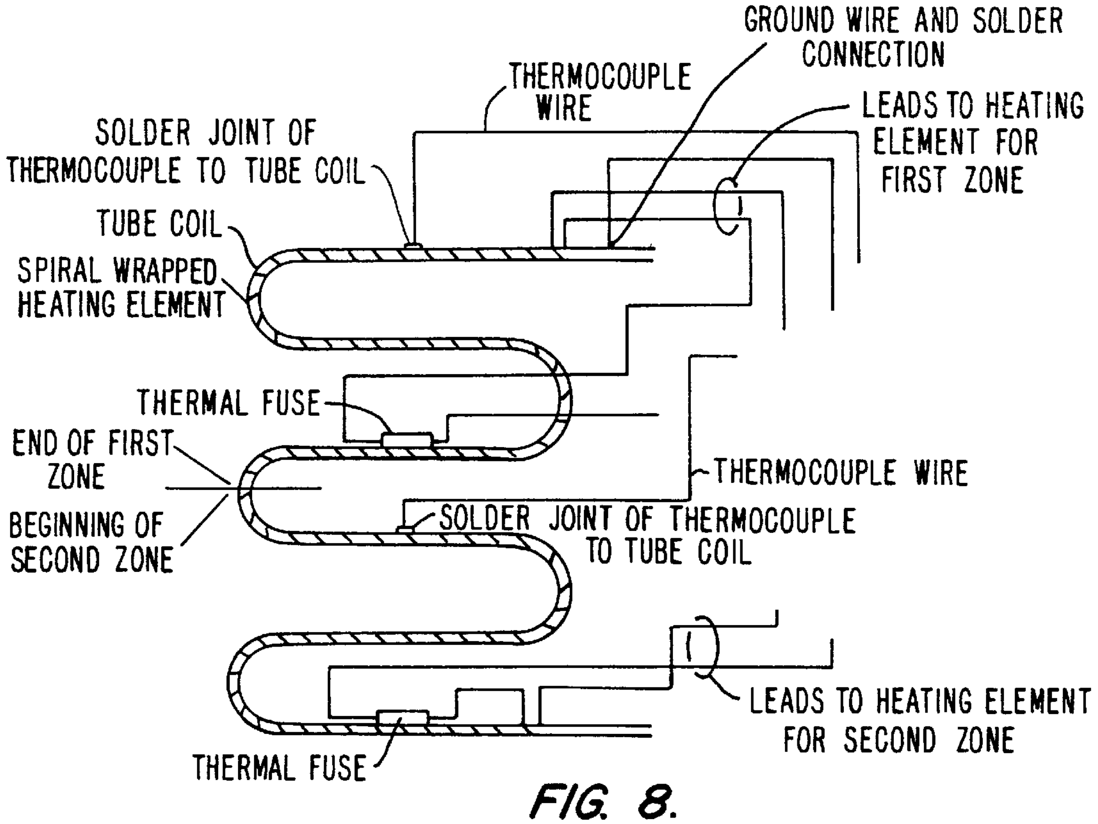
FIG. 8 is a schematic diagram of a heating coil of the present invention useful in understanding and correcting overheating.
Figure 9:
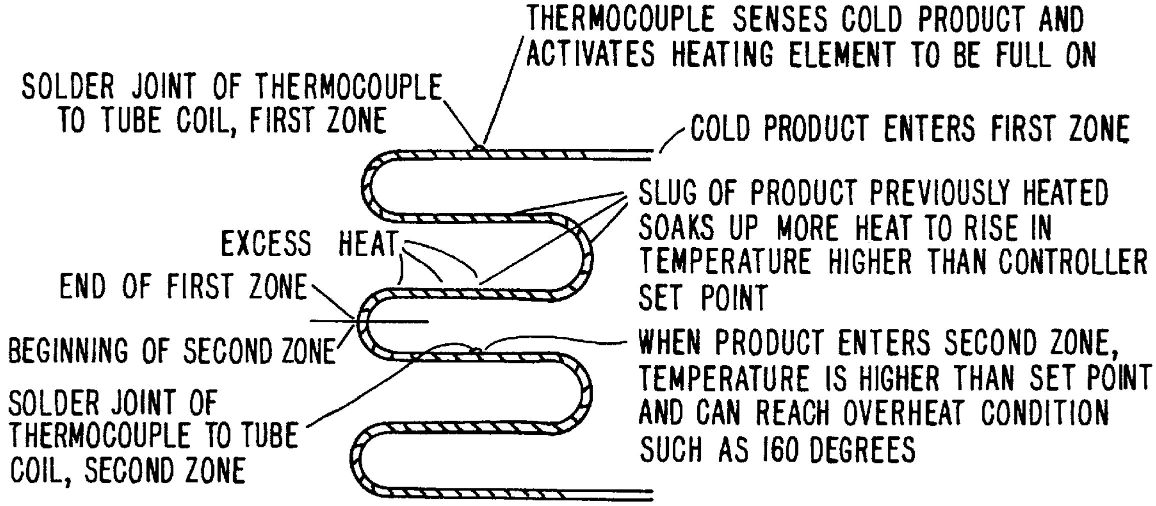
FIG. 9 is a schematic diagram of the heating coil of FIG. 8 and is also useful in understanding and correcting overheating.

It has been found that with some products and under some conditions of use, overheating may occur in the system. For example, when the product is cheese, there may be occasions of overheating which can be fixed. FIG. 8 shows a schematic layout of the heating system. FIG. 9 graphically illustrates the condition that leads to a undesirable rise in temperature of the product. This condition occurs when the dispensing of the product is slow and intermittent. During slow flow conditions, when cold product enters the first heating zone, the thermocouple senses the drop in temperature and turns the heating element full on. Normally, during regular flow conditions, all of the product in the first zone would be heated to the set point and would flow through the dispense nozzle at the desired temperature.

However, if the conditions are slow, a slug of previously heated product lingers in the latter part of the first zone and soaks up an extraordinary amount of heat. Then this slug of hot product enters the second zone and causes the temperature reading to be high. If the temperature of the second zone reads as high as 170°, this means the product is as high as 155°. At this point, the product starts to liberate a slight amount of steam and expands. The expansion can cause excess dripping at the dispense nozzle. It is important to note that although the higher temperature is registered in the second zone, the overheating is taking place in the first zone. This condition is highly exacerbated if there is air in the bag of product, i.e., cheese. In fact, air alone will cause excess dripping even when the overheat condition does not exist.

There are several solutions to the overheat condition. The first is to lower the temperatures of both controllers. The first zone could be set at 125 to 135°. The exact setting for the first zone may need to be determined with testing and field evaluation. Originally set both controllers may be set to 140°. However, it was found in initial testing of a cheese dispensing system that 145° provided a very warm cheese that was just about right. However, this may have been a premature conclusion. The settings should be reverted to a lower temperature for the first zone that will act as a preheat zone (125–135°) and a higher temperature for the second zone as a maintenance zone (140–145°).

In addition, ½-inch thick rubber insulation sheets should be removed from the heater box. Also, removing the insulation wrap around the first and/or second straight span of the first zone where the overheating condition takes place may be considered. This will allow the heat to liberate from the one place where the overheating takes place at a much faster rate, possibly eliminating the packed-in overheat condition at this location.

The question may arise as to why the thermocouple location is not moved to a point more to the middle of the heating zone for the first zone. The answer is that this configuration would not service the heat load requirement for fast flow conditions when customer demand is at its highest. Then some customers would receive cheese that is too cold.

Thus, the present invention includes a method of providing hot condiment to a delivery nozzle for flow therethrough. The desired temperature of the condiment flowing from the delivery nozzle is decided as well as a desired maximum flow rate of the condiment from the delivery nozzle. The maximum temperature at which the condiment may be exposed for a predetermined time without being substantially degraded by heat is determined. An inner diameter of a flow tube for flowing condiment is determined. A minimum flow tube length is also determined. The desired location to measure temperature of the condiment in the flow tube is determined. A flow tube is connected between a source of condiment and a delivery nozzle, the flow tube being at least as long as the determined minimum flow tube length. The temperature of the condiment is measured at the desired location. This location is determined to be at a distance from the delivery nozzle so that when the condiment is in continuous flow it will be heated to the desired temperature by the time it reaches the nozzle. The condiment is heated to a temperature less than the determined maximum temperature, and condiment is flowed through the flow tube while the temperature of the condiment is controlled so that the condiment is dispensed at the nozzle at the desired temperature.

Thus, the present invention provides a system and method of dispensing heated condiment from a condiment source. The condiment is flowed through a heater hose, and the temperature of the condiment is controlled within predetermined values by sensing the temperature of the condiment in the hose and controlling the operation of the heater hose to maintain the temperature of the condiment at a value which results in the dispensing of condiment at a desired temperature.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

We claim:

1. A method of providing hot condiment to a delivery nozzle for flow therethrough using a heated flow tube, the method comprising the steps of determining a desired temperature of the condiment flowing from the delivery nozzle; determining a desired maximum flow rate of the condiment from the delivery nozzle; determining a maximum temperature at which the condiment will not be substantially degraded by heat after being exposed for a predetermined time; determining a minimum flow tube length of the flow tube based on maximum flow heat transfer at the desired maximum flow rate of the condiment; connecting the flow tube between a source of condiment and the delivery nozzle, said flow tube being at least as long as said minimum flow tube length; measuring the temperature of the condiment; heating said condiment in the flow tube to a temperature less than said determined maximum temperature; and flowing condiment through said flow tube.

2. The method of claim 1 further comprising the step of determining a desired location to measure temperature of the condiment in the flow tube to insure that condiment at the desired temperature is dispensed from the delivery nozzle even at times of continuous maximum flow of condiment at the desired maximum flow rate, wherein the temperature of the condiment is measured at the desired location.

3. The method of claim 1 further comprising the step of determining a desired location to measure temperature of the condiment in the flow tube based on maximum flow heat transfer per unit length of the flow tube at the desired maximum flow rate of the condiment, wherein the temperature of the condiment is measured at the desired location.

4. The method of claim 1 further comprising the steps of determining an inner diameter of the flow tube based on no flow heat transfer; and providing the flow tube with the determined inner diameter.

5. A method of providing hot condiment to a delivery nozzle for flow therethrough using a heated flow tube, the method comprising the steps of determining a desired temperature of the condiment flowing from the delivery nozzle; determining a desired maximum flow rate of the condiment from the delivery nozzle; determining a maximum temperature at which the condiment will not be substantially degraded by heat after being exposed for a predetermined time; determining the desired location to measure temperature of the condiment in the flow tube based on maximum flow heat transfer per unit length of the flow tube at the desired maximum flow rate of the condiment; connecting the flow tube between a source of condiment and the delivery nozzle; measuring the temperature of the condiment at said desired location; heating said condiment in the flow tube to a temperature less than said determined maximum temperature; and flowing condiment through said flow tube.

6. The method of claim 5 further comprising the steps of determining an inner diameter of the flow tube based on no flow heat transfer; and providing the flow tube with the determined inner diameter.

7. The method of claim 5 further comprising the steps of determining a minimum flow tube length of the flow tube based on maximum flow heat transfer at the desired maximum flow rate of the condiment; and providing the flow tube which is at least as long as the determined minimum flow tube length.

8. The method of claim 5 further comprising the step of controlling the heating of the condiment in the flow tube based on the measured temperature at the desired location.

9. The method of claim 5 further comprising the steps of measuring the temperature of the condiment at a plurality of locations along the flow tube to identify regions of overheating; and providing insulation around the flow tube with the amount of insulation being less in the regions of overheating than in remaining regions to reduce overheating.

* * * * *